United States Patent
Vanga

(10) Patent No.: US 9,684,407 B2
(45) Date of Patent: Jun. 20, 2017

(54) METHOD AND APPARATUS FOR DETERMINING SHAPE AND ORIENTATION OF A TOUCH OBJECT ON HANDHELD DEVICES

(71) Applicant: Samsung Electronics Co., Ltd., Suwon-si, Gyeonggi-do (KR)

(72) Inventor: Sandeep Vanga, Hyderabad (IN)

(73) Assignee: SAMSUNG ELECTRONICS CO., LTD. (KR)

( * ) Notice: Subject to any disclaimer, the term of this patent is extended or adjusted under 35 U.S.C. 154(b) by 203 days.

(21) Appl. No.: 14/693,859

(22) Filed: Apr. 22, 2015

(65) Prior Publication Data
US 2016/0313843 A1    Oct. 27, 2016

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04103* (2013.01)

(58) Field of Classification Search
CPC ...... G06F 1/1643; G06F 1/169–1/1692; G06F 3/03547; G06F 3/041–3/0418; G06F 3/0416; G06F 3/0421; G06F 3/0426; G06F 3/0428; G06F 3/0488; G06F 2203/0339; G06F 2203/04101; G06F 2203/04103–2203/04113
See application file for complete search history.

(56) References Cited

U.S. PATENT DOCUMENTS

| 5,317,140 A | 5/1994 | Dunthorn |
| 6,256,021 B1 * | 7/2001 | Singh .................... G06F 3/0418 345/173 |

(Continued)

FOREIGN PATENT DOCUMENTS

EP    2616912 A1    7/2013

OTHER PUBLICATIONS

Ernst, "Learning to Integrate Arbitrary Signals From Vision and Touch," Journal of Vision (2007), received Nov. 15, 2006; published Jun. 25, 2007, ISSN 1534-7362, pp. 1-14.
Fitzgibbon et al., "Direct Least Square Fitting of Ellipses," IEEE Transactions on Pattern Analysis and Machine Intelligence, vol. 21, No. 5, May 1999, pp. 476-480.

(Continued)

*Primary Examiner* — Sanghyuk Park
(74) *Attorney, Agent, or Firm* — Renaissance IP Law Group LLP

(57) ABSTRACT

A method and apparatus are disclosed for determining the shape and orientation of an object touching a touch panel on, for example, a handheld device. The method comprises extracting and storing in a training phase a plurality of touch attributes corresponding to a plurality of predefined objects touching the touch panel, receiving in a test phase an input data for a test object touching the touch panel, wherein the input data comprises a plurality of values corresponding to difference mutual capacitance at each node of the touch panel, determining a plurality of touch attributes associated with the test object by comparing the input data with the plurality of features extracted during the training phase and approximating input data of the test object with the plurality of touch attributes obtained in the training phase to determine the shape and orientation of the test object.

20 Claims, 10 Drawing Sheets

(56) References Cited

U.S. PATENT DOCUMENTS

| | | | |
|---|---|---|---|
| 6,323,846 B1* | 11/2001 | Westerman | G06F 3/0235 345/173 |
| 6,856,259 B1 | 2/2005 | Sharp | |
| 7,812,828 B2 | 10/2010 | Westerman et al. | |
| 8,339,379 B2 | 12/2012 | Goertz et al. | |
| 8,350,831 B2 | 1/2013 | Drumm | |
| 8,378,974 B2 | 2/2013 | Aroyan et al. | |
| 8,502,798 B2 | 8/2013 | Taylor et al. | |
| 8,605,051 B2 | 12/2013 | Hotelling et al. | |
| 9,081,450 B1* | 7/2015 | Mohindra | G06F 3/044 |
| 2006/0244735 A1 | 11/2006 | Wilson | |
| 2008/0106520 A1 | 5/2008 | Free et al. | |
| 2009/0021489 A1 | 1/2009 | Westerman et al. | |
| 2012/0268403 A1 | 10/2012 | Christiansson | |
| 2013/0181939 A1* | 7/2013 | Fahn | G06F 3/0416 345/174 |
| 2014/0002407 A1* | 1/2014 | Badaye | G06F 3/04883 345/174 |

OTHER PUBLICATIONS

Goshtasby, "Design and Recovery of 2-D and 3-D Shapes Using Rational Gaussian Curves and Surfaces," International Journal of Computer Vision, 10:3, 1993, pp. 233-256.

Goshtasby, "Geometric Modelling Using Rational Gaussian Curves and Surfaces," Computer-Aided Design, vol. 27, No. 5, May 5, 1995, pp. 363-375.

Piater et al., "Multi-Modal Tracking of Interacting Targets Using Gaussian Approximations," Second IEEE International Workshop on Performance Evaluation of Tracking and Surveillance (at CVPR 2001), pp. 1-8.

Wang et al., "Detecting and Leveraging Finger Orientation for Interaction with Direct-Touch Surfaces," UIST '09, Oct. 4-7, 2009, Victoria, British Columbia, Canada, pp. 23-32.

Wen et al., "Detection of Partial Ellipses Using Separate Parameters Estimation Techniques," Institute of Information Science Northern Jiaotong University Beijing 100044, P.R. China, BMVC 1994, pp. 255-264.

* cited by examiner

METHOD AND APPARATUS FOR DETERMINING SHAPE AND ORIENTATION OF A TOUCH OBJECT ON HANDHELD DEVICES

FIELD

The embodiments disclosed herein generally relate to touch interfaces and particularly to handheld electronic devices comprising capacitive-touch interfaces. More particularly, the embodiments disclosed herein relate to a method and apparatus for determining a shape of a touching object on a capacitive-touch interface of a handheld device.

BACKGROUND

As emphasis is being placed on simple and intuitive user interfaces, many new techniques for interacting with electronics devices are being developed. Touch-screen interfaces are becoming popular because of their ease of use. By touching a touch-screen display or touch panel using fingers or stylus, a user can make selections or move cursors, etc.

Among the various types of touch technologies, capacitive-touch sensing is gaining popularity because of its reliability, ease of implementation and capability to handle multi-touch inputs. Capacitive-touch sensing can be accomplished by either detecting a change in self-capacitance or a change in mutual capacitance. A change in mutual capacitance enables multi-touch events to be detected. Consequently, all of the latest capacitive touch panels detect changes in mutual capacitance for touch sensing.

Mutual capacitance based touch panels can have different patterns of sensor electrodes. One of the most common electrode patterns is called a diamond pattern in which both horizontal electrodes and vertical electrodes are overlaid on each other to cover an entire display region. The nodes at intersections between the horizontal and vertical electrodes form the mutual capacitance. In the presence of an external conducting object, mutual capacitance value decreases from a normal or ambient value. The amount of change in mutual capacitance is different at different nodes of the diamond pattern for an external conducting object. Determining the exact shape of a touching object would seem to be intuitive by using a threshold-based method to isolate the region of touch. Nevertheless, intuitive threshold-based methods do not adequately work due to many reasons like the coarseness of the grid of electrodes and various ambient noise sources.

In case of handheld devices, power consumption is an important criterion to be considered when designing the device. The power consumption of the device increases significantly as the number of electrodes increases. Consequently, there is a practical limitation to the density of electrodes of a touch panel. The typical pitch between electrodes is 4-5 mm. Given a 5×2.7 inch display, only a 30×17 grid of electrodes at 4 mm pitch can be realized. The size of a touching object could be as small as 2×2 mm. Thus, it is possible to contain the shape of the entire touching object inside four grid nodes. In this case, however, the mutual capacitance of only a few electrodes is affected, and sensing the touching object would be based on low-resolution data. Even in the case of a larger touching object, determining the orientation of the touching object would be performed based on low-resolution data.

Secondly, many unavoidable ambient noise sources exist that affect quality of the mutual capacitance data. For example, in order to reduce the display panel thickness, the touch sensors are placed very near to the display driving lines. This technology is referred to as on-cell capacitive sensing. In on-cell capacitive touch panels, the display noise in touch signals due to the cross-coupling between display lines and touch sensors is a critical problem. Though some noise removal techniques are being proposed, it is impossible to completely eliminate such noise. Additionally, there are many other noise sources, like charger noise, environmental changes, etc., that affect the quality of the mutual capacitance data.

In view of the foregoing, estimating the shape and orientation of the touching object in a low-resolution touch grid in the presence of noise is a challenge, particularly for high-end applications like games, paintings, etc.

The foregoing examples of the related art and limitations related therewith are intended to be illustrative and not exclusive. Other limitations of the related art will become apparent upon a reading of the specification and a study of the drawings.

SUMMARY

The various embodiments disclosed herein provide a method and apparatus for determining shape and orientation of a touch related to a touch data and an indirect data, in which difference capacitance values are mapped onto a capacitance variation curve over a specified grid that is based on touch positions of a touch surface, a peak of the capacitance variation curve is identified, the capacitance variation curve is normalized with the peak, and approximating the first input data with two a dimensional anisotropic Gaussian in the training phase.

According to an exemplary embodiment, a feature extraction module is adapted for obtaining a second input data over a given grid for each subclass, forming a capacitance variation curve by scanning the second input data over the given grid, wherein the second input data comprises of panel grid metadata and subclass metadata, extracting one or more features associated with the touch, performing feature accumulation for each sub class and storing the extracted features.

According to an exemplary embodiment, the feature extraction module is further adapted for evaluating a plurality of touch responses for a same touching object by varying the touch location over a dense two-dimensional grid having equally spaced multiple touch points between electrodes.

According to an exemplary embodiment, each capacitance variation curve comprises a subclass.

According to an exemplary embodiment, the capacitance variation curve of a single subclass is obtained using the same touch grid along with different angles of orientation of the touch object, and/or a plurality of touch grids across the touch surface at a same angle of orientation of the touching object.

According to an exemplary embodiment, the one or more touch attributes comprise amplitude, a major axis length, and a minor axis length.

According to an exemplary embodiment, a class comprises a set of elliptical touching objects with a specified major axis length and a minor axis length.

According to an exemplary embodiment, a subclass comprises a set of elliptical touching objects belonging to a class having a defined angle of orientation.

An exemplary embodiment further provides an apparatus for extracting a plurality of touch attributes corresponding to a touch input during a testing phase. The apparatus comprises a classifier module adapted for identifying a center location of an touch input, normalizing the touch input with an amplitude of the touch, comparing the touch input to a threshold to remove noise from the input data, identifying one or more errors associated with the touch input and identifying an optimal touch profile for the touch input by selecting a two-dimensional anisotropic Gaussian corresponding to a minimum error.

According to an exemplary embodiment, the classifier module is further adapted for identifying the plurality of touch attributes associated with a class corresponding to the selected 2D anisotropic Gaussian and associating the plurality of touch attributes with the touch input.

According to an exemplary embodiment, the plurality of touch attributes comprises a major axis length, a minor axis length, and an angle of orientation.

One exemplary embodiment provides a method for determining shape and orientation of a touching object on a touch interface, in which the method comprises receiving input data from the touch surface corresponding to the touching object from the touch interface, the touch surface comprising an axis and a plurality of nodes, the input data for the touching object comprising a plurality of values corresponding to a difference of mutual capacitance at each node, and the touching object comprising a shape and an orientation with respect to the axis of the touch surface; determining a normalized amplitude of the input data for the touching object; comparing the normalized amplitude of the input data for the touching object with different angles of orientation of each of a plurality of two-dimensional (2D) Gaussian curves, each 2D Gaussian curve respectively corresponding to input data for a plurality of training-set touching objects; determining a minimum error between the input data for the touching object and each of the differently oriented plurality of 2D Gaussian curves; and associating attributes of the training-set corresponding to the determined minimum error with the input for the touching object, the attributes of the training-set data corresponding to the determined minimum error comprising an input-touch difference amplitude, a length of a major axis of the touching object and a length of a minor axis of the touching object. In one exemplary embodiment, comparing the normalized amplitude of the input data for the touching object with different angles of orientation of each of a plurality of two-dimensional (2D) Gaussian curves comprises mapping a plurality of input data for each of a plurality of training-set touching objects onto a densely spaced 2D grid for a plurality of orientations with respect to the axis of the touch surface, the densely spaced 2D grid comprising a plurality of equally spaced touch points between electrodes of the touch surface; and comparing the normalized amplitude of the input data for the touching object with an amplitude of each training-set data. In another exemplary embodiment, mapping a plurality of touch data for each of a plurality of training-set touching objects onto a densely spaced 2D grid for a plurality of orientations further comprises extracting the attributes for each training-set touching object. In yet another exemplary embodiment, the method further comprises obtaining training-set data for each of a plurality of training-set touching objects and orientations, the training-set for the plurality touching object comprising input data for a touching object and indirect data for the touching object; mapping difference mutual capacitance values for each of the plurality of training-set data onto a capacitance variation curve over a grid location corresponding to each training-set data; identifying a peak value of the mapped difference mutual capacitance values for each training-set data of the plurality of training-set touching objects; normalizing the capacitance variation curve for each training-set data for the plurality of training-set touching objects based on the identified peak value for the respective training-set input data; approximating the training-set data for each training-set touching objects by a two-dimensional Gaussian curve; and determining a standard deviation of a major axis and a standard deviation of a minor axis for each training-set data of the plurality of training-set touching objects. In still another exemplary embodiment, the method further comprises initializing the capacitance variance curve for the touch surface based on a size of the touch surface. In yet another exemplary embodiment, the method further comprises storing the determined the standard deviation of a major axis and the standard deviation of a minor axis for each training-set data of the plurality of training-set touching objects. In one exemplary embodiment, the touch surface is part of a touch-screen display that is part of a smart phone or a tablet.

Another exemplary embodiment provides a system comprising a touch-screen display comprising a touch surface having an axis and a plurality of nodes; and at least one processor coupled to the touch-screen display, the at least one processor being configured to receive input data from the touch surface corresponding to a touch from a touching object, the input data for the touching object comprising a plurality of values corresponding to a difference of mutual capacitance at each node of the touch surface, and the touching object comprising a shape and an orientation with respect to the axis of the touch surface; determine a normalized amplitude of the input data for the touching object; compare the normalized amplitude of the input data for the touching object with different angles of orientation of each of a plurality of two-dimensional (2D) Gaussian curves, each 2D Gaussian curve respectively corresponding to input data for a training-set input touch data of a plurality of training-set touching objects; determine a minimum error between the input data for the touching object and each of the differently oriented plurality of 2D Gaussian curves; associate attributes of the training-set touching objects corresponding to the determined minimum error with the touching object, the attributes of the training-set touching objects corresponding to the determined minimum error comprising an input-touch difference amplitude, a length of a major axis of the touching object and a length of a minor axis of the touching object; and determine a touch vector for the touching object. In another exemplary embodiment, the at least one processor is further configured to map a plurality of touch data for each of a plurality of training-set touching objects onto a densely spaced 2D grid for a plurality of orientations with respect to the axis of the touch surface, the densely spaced 2D grid comprising a plurality of equally spaced touch points between electrodes of the touch surface; and compare the normalized amplitude of the input data with an amplitude each training-set touching object. In another exemplary embodiment, the at least one processor is further configured to extract the attributes for each training-set touching object. In still another exemplary embodiment, the at least one processor is further configured to obtain training-set data for each of a plurality of training-set touching objects and orientations, the training set data comprising touch data and indirect touch data; map difference mutual capacitance values for each of the plurality of training-set data onto a capacitance variation curve over a grid location corresponding to each training-set data; identify a peak value of the mapped difference mutual capacitance values for each training-set data of the plurality of training-set touching objects; normalize the capacitance variation curve for each training-set data of the plurality of training-set touching objects based on the identified peak value for the respective training-set input touch; approximate the training-set input data for each training-set data of the plurality of training-set touching objects by a two-dimensional Gaussian curve; and determine a standard deviation of a major axis and a standard deviation of a minor axis for each training-set data of the plurality of training-set touching objects. In yet another exemplary embodiment, the at least one processor is further configured to initialize the capacitance variance curve for the touch surface based on a size of the touch surface. In another exemplary embodiment, the at least one processor is further configured to store the determined the standard deviation of a major axis and the standard deviation of a minor axis for each training-set data of the plurality of training-set touching objects. In an exemplary embodiment, the touch-screen display is part of a smart phone or a tablet.

Another exemplary embodiment provides a method for determining shape and orientation of a touching object on a touch interface, the method comprising obtaining training-set data for each of a plurality of training-set touching objects and orientations, the touch surface comprising an axis and a plurality of nodes, and the training set data comprising touch data and indirect touch data received from the touch interface for the plurality of training-set touching objects; mapping difference mutual capacitance values for each of the plurality of training-set touching objects onto a capacitance variation curve over a grid location corresponding to each training-set touching object; identifying a peak value of the mapped difference mutual capacitance values for each training-set data of the plurality of training-set touching objects; normalizing the capacitance variation curve for each training-set data of the plurality of training-set touching objects based on the identified peak value for the respective training-set touching object; approximating the training-set input data for each training-set touching object by a two-dimensional Gaussian curve; determining a standard deviation of a major axis and a standard deviation of a minor axis for each training-set touching object; storing the determined the standard deviation of a major axis and the standard deviation of a minor axis for each training-set touching object. In another exemplary embodiment, the method further comprises receiving input data from the touch surface corresponding to a first touching object from the touch surface, the first touching object comprising a shape and an orientation with respect to the axis of the touch surface; determining a normalized amplitude of the input data for the first touching object; comparing the normalized amplitude of the input data for the first touching object with different angles of orientation of each of a plurality of two-dimensional (2D) Gaussian curves, each 2D Gaussian curve respectively corresponding to input data for a training-set of the plurality of training-set touching objects; determining a minimum error between the input data of the first touching object and each of the differently oriented plurality of 2D Gaussian curves; associating attributes of the training-set data corresponding to the determined minimum error with the first touching object, the attributes of the training-set data corresponding to the determined minimum error comprising an input-touch difference amplitude, a length of a major axis of the first touching object and a length of a minor axis of the first touching object; and determining a touch vector for the first touching object. In yet another exemplary embodiment, comparing the normalized amplitude of the input data of the first touching object with different angles of orientation of each of a plurality of two-dimensional (2D) Gaussian curves comprises mapping a plurality of touch data for each of the plurality of training-set touching objects onto a densely spaced 2D grid for a plurality of orientations with respect to the axis of the touch surface, the densely spaced 2D grid comprising a plurality of equally spaced touch points between electrodes of the touch surface; and comparing the normalized amplitude of the input data for the first touching object with an amplitude each training-set data for a plurality of touching objects. In still another exemplary embodiment, the touch surface is part of a touch-screen display and the touch-screen display is part of a smart phone or a tablet.

The foregoing has outlined, in general, various aspects of exemplary embodiments and is to serve as an aid to better understanding the more complete detailed description which is to follow. In reference to such, there is to be a clear understanding that the subject matter disclosed herein is not limited to the methods, apparatus, systems and/or applications of use described and illustrated herein. It is intended that any other advantages and objects of the disclosed subject matter that become apparent or obvious from the detailed description or illustrations contained herein are within the scope of the appended claims.

BRIEF DESCRIPTION OF THE DRAWINGS

The other objects, features and advantages will occur to those skilled in the art from the following description of exemplary embodiments and the accompanying drawings in which.

Figure 1A:
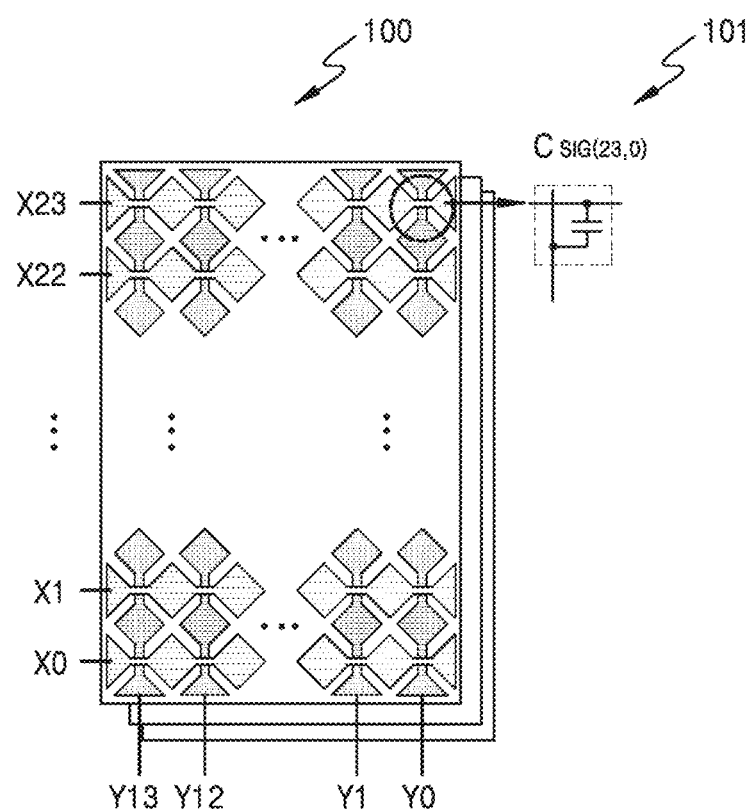
FIG. 1A depicts a schematic representation of a touch panel of a handheld electronic device showing a touch signal data profile according to an exemplary embodiment of the subject matter disclosed herein.

Although specific features of the present subject matter are shown in some drawings and not in others, this is done for convenience only as each feature may be combined with any or all of the other features in accordance with the subject matter disclosed herein.

DETAILED DESCRIPTION

The subject matter disclosed herein provides a method and apparatus for determining the shape and orientation of a touching object on a touch panel of, for example, a handheld device. In the following detailed description of exemplary embodiments, reference is made to the accompanying drawings that form a part hereof, and that show by way of illustration specific embodiments in which the claimed subject matter may be practiced. These exemplary embodiments are described in sufficient detail to enable those skilled in the art to practice the claimed subject matter, and it is to be understood that other embodiments may be utilized and that changes may be made without departing from the scope of the claimed subject matter. The following detailed description is, therefore, not to be taken in a limiting sense, and the scope of the claimed subject matter is defined only by the appended claims. Additionally, the word "exemplary" is used herein to mean "serving as an example, instance, or illustration." Any embodiment described herein as "exemplary" is not to be construed as necessarily preferred or advantageous over other embodiments.

The subject matter disclosed herein provides a method and apparatus for enabling determination of a touch-vector for an elliptically shaped object touching a capacitive-touch sensing interface or panel based on feature, or attribute, extraction from the touch input. The method includes determining three attributes, i.e., a major axis length, a minor axis length and an angle of orientation, for a given touching object using a classifier-based approach. Each elliptically shaped touching object has a distinctive attribute combination of a major axis, a minor axis and an angle of orientation varying from 0 to 180 degrees with respect to an axis aligned with the touch panel. A touching object imparts a two-dimensional (2D) anisotropic Gaussian-like touch input on a touch panel as detected at the nodes of intersection of the electrodes of the touch panel. The features, or attributes, of the difference mutual capacitance input touch data of the touching object are extracted by approximating the data to a 2D anisotropic Gaussian curve that is used to train a classifier device. According to an exemplary embodiment herein, the 2D anisotropic Gaussian curve is a 2D bell curve and can have different standard deviations in different directions.

According to an exemplary embodiment, a training set of capacitive touch response curves is formed for multiple orientations of each elliptically shaped object that is to be identified during a training phase. Each touch vector is represented as a two-dimensional anisotropic Gaussian curve. That is, each capacitive touch response curve is approximated by a 2D anisotropic Gaussian curve having a center that is the same as the center of a capacitive touch response curve and includes three-dimensional attributes comprising of a peak amplitude value (A), a standard deviation along a major axis ($\sigma_{major}$) and a standard deviation along a minor axis ($\sigma_{minor}$). Further, in one exemplary embodiment, a classifier device is trained based on attributes determined in the training phase to represent different elliptically shaped objects in order to identify an unknown touching object (referred to herein as a "test object") during a test or an operational phase. A center of the touch input of the test object is found using a well-known centroid algorithm. The test object is approximated using the accumulated training-set attributes by rotating each training-set attribute through a predetermined set of orientations around its center to identify the training-set attribute having the least error with respect to the test object input and to thereby provide a touch vector for the test object.

Figure 1B:
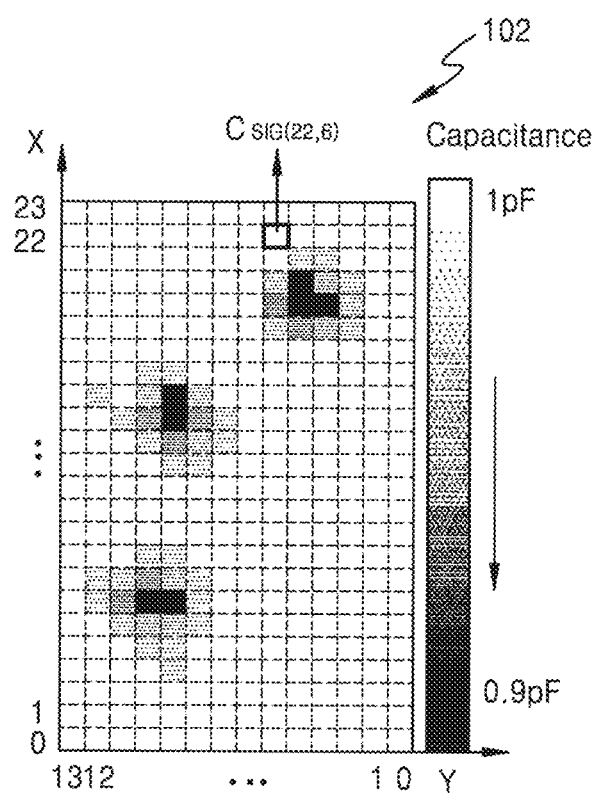
FIG. 1B depicts a representation of the touch panel of FIG. 1A as two-dimensional coordinate system in which several exemplary touch signal data profiles are shown.

FIG. 1A depicts a schematic representation of a touch panel 100 of a handheld electronic device according to an exemplary embodiment. A mutual capacitance is formed at the intersection, or node, of the transmitting and receiving electrodes. As shown in FIG. 1A, a mutual capacitance is formed at the node of transmitting electrode X23 and receiving electrode Y0. An equivalent circuit for the mutual capacitance is indicated at 101. In an exemplary embodiment, the touch panel 100 of a handheld electronic device is arranged to represent a two-dimensional coordinate system with Y coordinates along the horizontal axis and X coordinates along the vertical axis. The origin of the touch panel is defined at (0,0). Each point on the X-Y plane is defined at the point of intersection of corresponding X and Y coordinates. FIG. 1B depicts a representation of the touch panel of FIG. 1A as two-dimensional coordinate system 102 in which several exemplary touch data profiles are shown.

According to an exemplary embodiment, when one of the transmitter electrodes is excited with a voltage pulse, the charge accumulated at the electrodes is collected at the receiving end and a capacitance at that point is measured. Similarly, at all Y0 to Y13 electrode coordinates along the Y axis, the capacitance data is measured for each transmitter channel excitation. When there is no object interacts with the surface of a touch panel, an un-touch (no touch) mutual capacitance data, which is called the ambient capacitance data, is obtained at each node. When a touching object interacts with the surface of the touch panel, the mutual capacitance data in that region of the panel is decreased from an ambient level. The decrease in the mutual capacitance values is greater at the center of the touching object and the mutual capacitance gradually increases towards the boundaries of the touching object. The amount of decrease in mutual capacitance is greater when the center of the touching object is aligned with any of the transmitting electrodes. Hence, a difference mutual capacitance, which is the difference between the ambient (no touch) capacitance data and touch capacitance data, provides information about the region of the touch. That is, the difference mutual capacitance values decrease in a radial fashion from the center region of the touch towards the boundary of the touching object. For example, FIG. 1B depicts three different instances of mutual capacitance data on the touch panel 100. A grey-scale ranging from complete black to complete white is shown on the right side of FIG. 1B in which the light grey indicates a higher capacitance value and a dark grey indicates a lower capacitance value. Hence, by looking at the capacitance data shown in the grid of FIG. 1B, it can be observed that wherever a touch occurs the capacitance value is reduced in a particular fashion, which is indicated by a darkest grey color at the center of the touch data and gradually becomes a lighter grey and then becomes white as the distance increases from the center of the touch.

Figure 2:
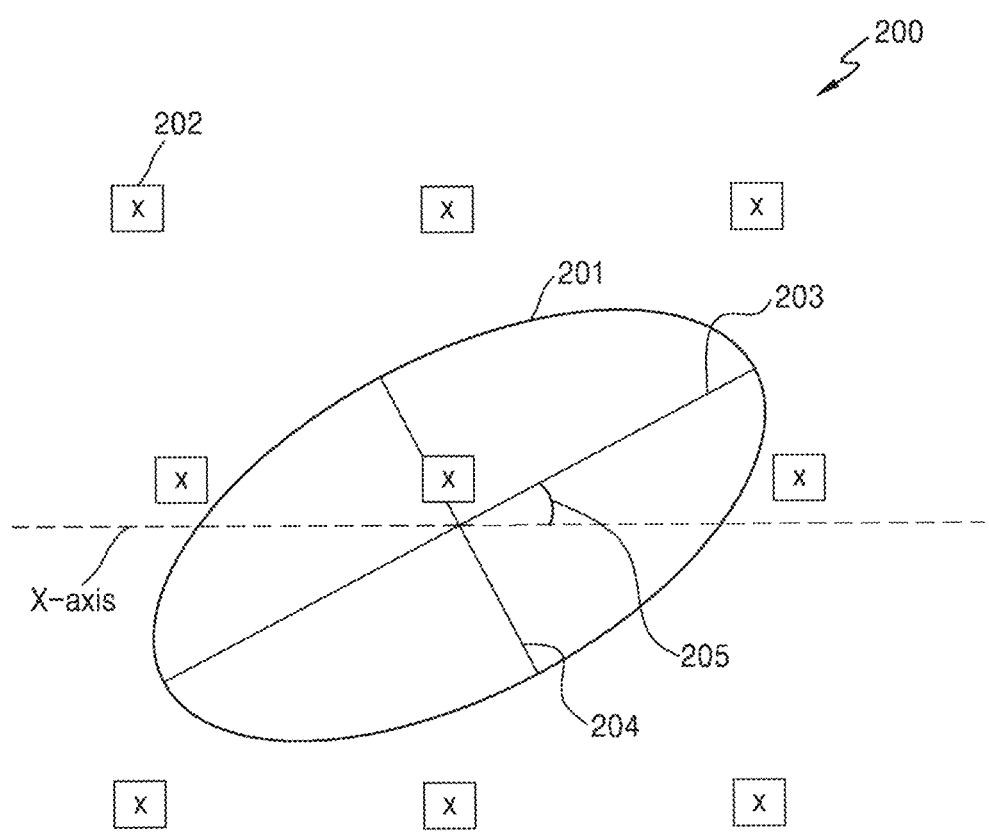
FIG. 2 is a graphical representation of a touching object overlaid on top of a touch panel according to an embodiment of the subject matter disclosed herein.

FIG. 2 is a graphical representation of a touching object 201 superimposed on a touch panel 200 according to an exemplary embodiment. In FIG. 2, the touching object 201 (i.e., a finger, a stylus, or any elliptically shaped object) is superimposed on the capacitive nodes 202 of touch panel 200. Also shown in FIG. 2, the touching object comprises attributes of a major axis length 203, a minor axis length 204 and an angle of orientation 205 with respect to the touch panel 200. The exemplary embodiments disclosed herein determine the touch attributes, that is, the major-axis length, the minor-axis length and the angle of orientation, that are associated with a given touching object using 2D arrays of difference mutual capacitance data. The major axis length is defined herein as the length of the longest diameter of the touch data of the touching object. Similarly, minor axis length is defined herein as the length of the shortest diameter of the touch data of the touching object, which is aligned with the axis that is perpendicular to the major axis. The angle of orientation is defined herein as the angle of the major axis with respect to the X-axis, as shown in FIG. 2. The touch location can be any intermediate position between nodes 202 formed by the electrodes (not shown). It is possible that a size of a given touching object could be within four nodes forming a square (such as depicted in FIG. 2) without overlapping with any of the nodes due a coarse grid structure of the electrodes and/or a small touching object size. This scenario could occur, for example, when the pitch between electrodes is on the order of 4 mm and the touching object size is 2 mm for both major and minor axes.

Figure 3:
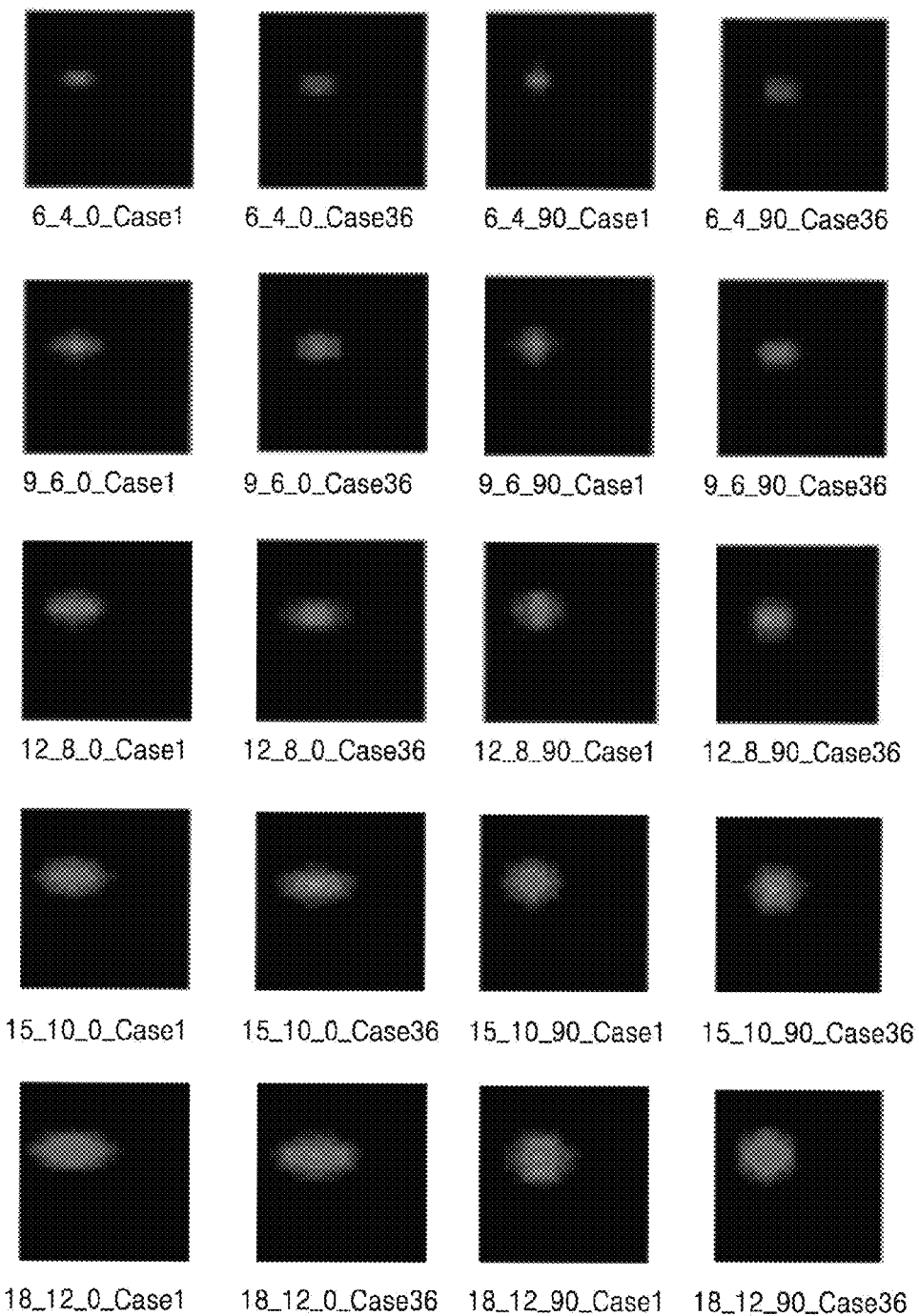
FIG. 3 is a pictorial representation of a plurality of mutual-capacitance data profiles with varying touching object size and angles of orientation according to an exemplary embodiment of the subject matter disclosed herein.

FIG. 3 is a pictorial representation of a plurality of mutual capacitance data profiles with varying touching object size and angles of orientation according to an exemplary embodiment. In FIG. 3, variations in the mutual capacitance of data profiles are shown as a change in the touching object size and angle of orientation. The nomenclature of FIG. 3 indicates a major axis length, a minor axis length, an angle of orientation and a case. For example, the nomenclature "9-6-0" represents a 9 mm major axis length, a 6 mm minor axis length and an angle of orientation of zero degrees. The nomenclature "case" represents a different pressure point (i.e., a center location of a touching object) on a representative touch screen. For example, case 1 and case 36 represent different pressure points on the representative touch screen. As shown in FIG. 3, when the size of the touching object increases, the area of touch panel affected also increases. The number of nodes affected by a given touching object, however, goes beyond the boundaries of the object. As the grid structure becomes coarser, it becomes more difficult to accurately determine the attributes, like the major axis length, the minor axis length and the angles of orientation, by extracting edge information and applying well-known techniques like randomized Hough transform or covariance-based methods. Also, at smaller sizes of a touching object there is no perceivable difference in orientation from 0 to 90 degrees due to the presence of noise. These problems are overcome by the subject matter disclosed herein, which provides a technique to accurately determine the touch attributes of a touching object by determining the shape and orientation of the touching object.

According to an exemplary embodiment, as each elliptically shaped touching object imparts some sort of a radial distribution of difference mutual capacitance values at discrete spatial locations on the touch panel, the data can be approximated by a 2D anisotropic Gaussian curve.

As the touching object size increases, more area is covered and inherently the parameters associated with corresponding 2D anisotropic Gaussian curves proportionately increase. The techniques disclosed herein utilize the characteristics of the touch data by employing a classifier that learns the characteristics associated with each touching-object size of a training set that are subsequently used to determine the attributes of an unknown touching object.

Figure 4:
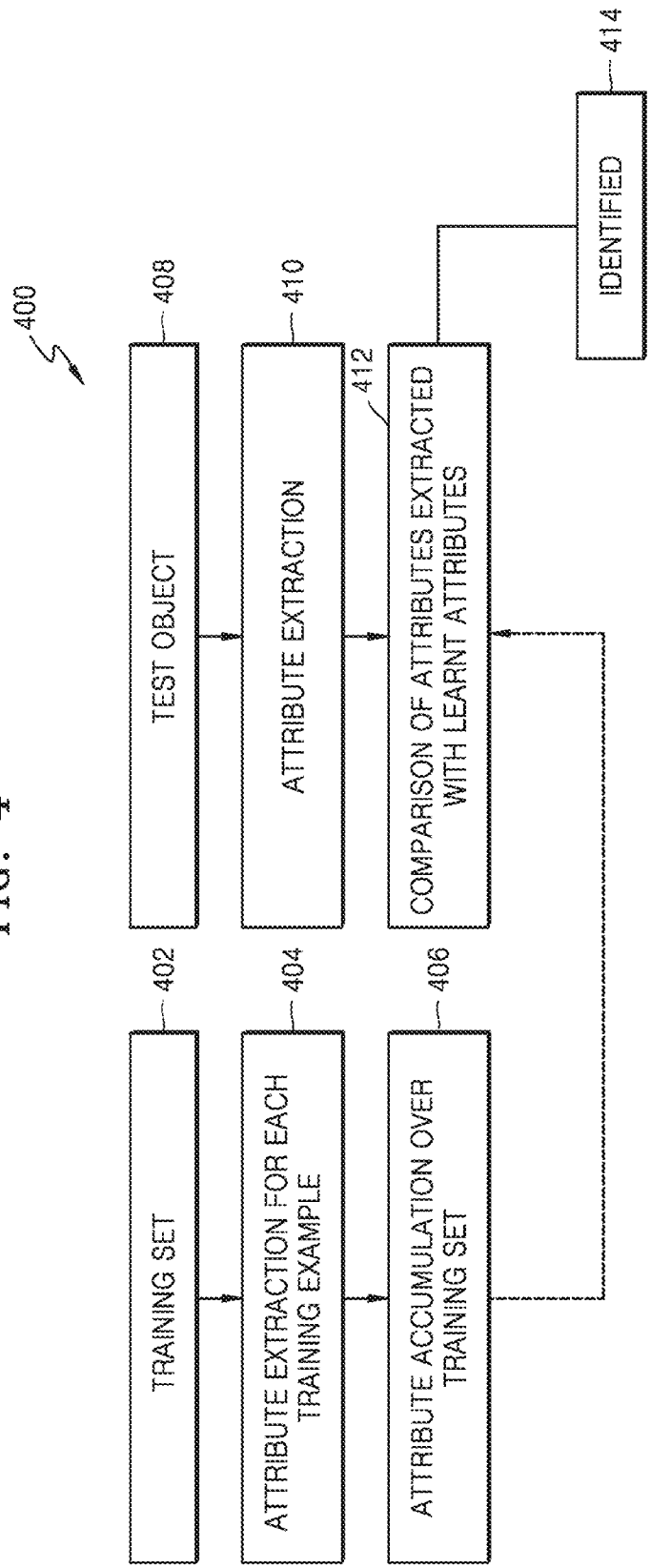
FIG. 4 is a flowchart providing an overview of an exemplary method for determining a shape of an object touching a touch panel according to an exemplary embodiment of the subject matter disclosed herein.

FIG. 4 is a flowchart providing an overview of an exemplary method 400 for determining a shape of an object touching a touch panel according to an exemplary embodiment. A training phase 420 is performed to learn the features, or attributes, corresponding to predefined touching objects. Subsequently, a test or an operational phase is performed to determine the attributes of an unknown touching object. In the training phase, a plurality of input touch data for a plurality of predefined touching objects is measured at block 402 to generate training-set data. The training-set data corresponds to values of differences of mutual capacitance at each node of the plurality of nodes of a touch panel for each of the predefined touching objects. At block 404, attribute extraction is performed on the training set data to identify the attributes corresponding to each of the predefined touching objects of the training set. Accumulation of the plurality of input touch attributes associated with the predefined touching objects in the training phase is performed at block 406 and stored. The accumulated training-set input touch attributes are referred to herein as learned training-set input touch attributes. In a testing or operational phase 430, an unknown touching object (referred to herein as a "test object") is used at 408 and input touch data is measured for the test object corresponding to values of differences of mutual capacitance at each node of the plurality of nodes of the touch panel. As indicated, the testing phase 430 could also correspond to a normal operation of a touch panel. Attributes associated with the test object are extracted during an attribute extraction phase at block 410. At block 412, a plurality of touch attributes associated with the test object are compared to the accumulated attributes extracted during the training phase (blocks 404 and 406 ). At block 414, the learned attributes that best fit the attributes of the test object are identified based on the results of the comparison of the extracted attributes of the test object with the attributes accumulated during the training phase 410, thereby providing a touch vector for the test object.

Figure 5:
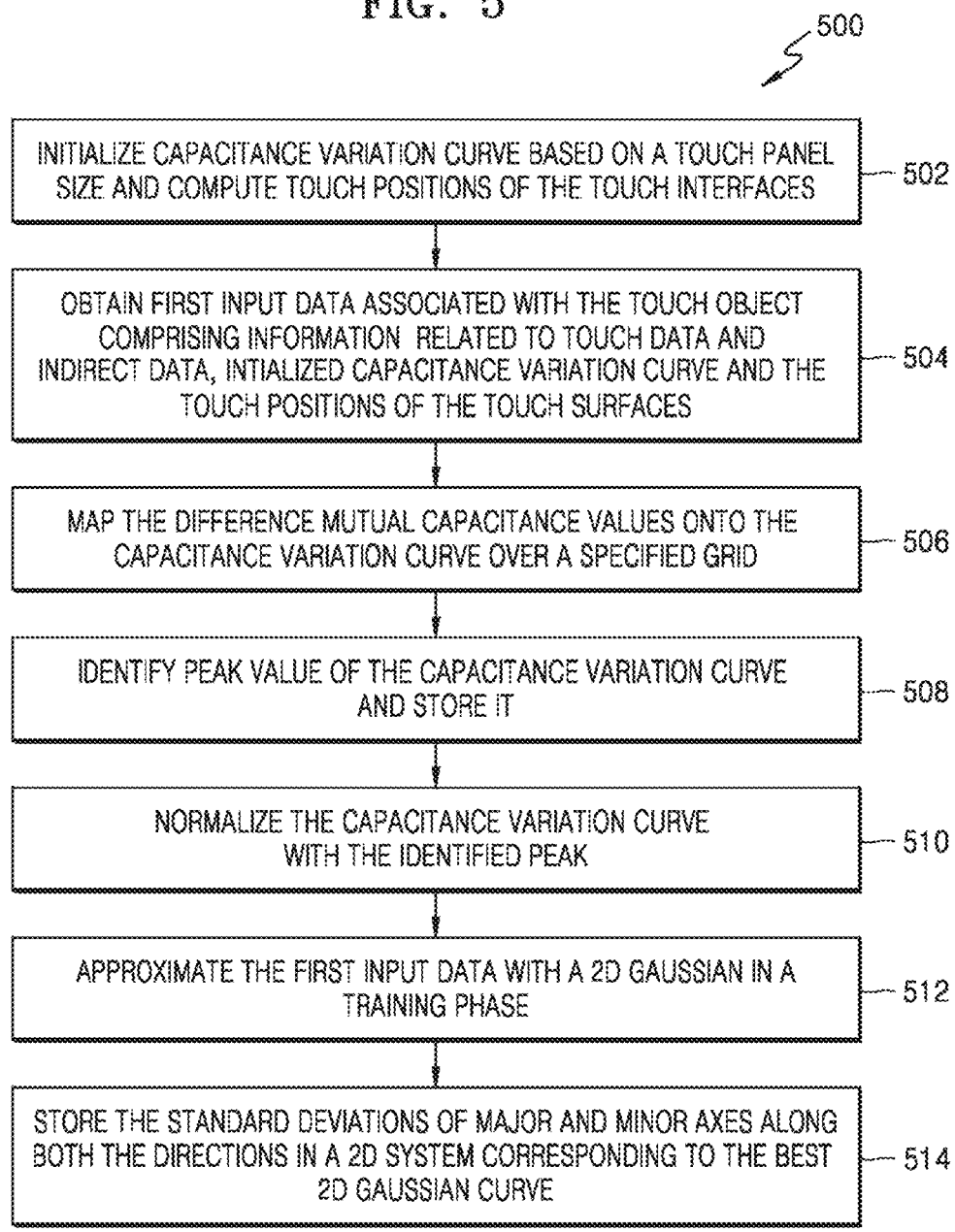
FIG. 5 is a flowchart depicting an exemplary method of extracting attributes corresponding to a touch profile during a training phase according to an exemplary embodiment of the subject matter disclosed herein.

FIG. 5 is a flowchart depicting an exemplary method 500 of extracting attributes corresponding to a touch profile during a training phase according to an exemplary embodiment. In one exemplary embodiment, the operations of block 404 in FIG. 4 may correspond to the operations of method 500. At block 502, a capacitance variation curve is initialized corresponding to a touch panel size (i.e., a number of vertical and horizontal electrodes). Touch positions of the touch interface are determined based on the number and locations of the vertical and horizontal electrodes. At block 504, input data associated with a predefined touching object is measured. The input data comprises information related to touch data and indirect data. That is, the input data comprises information related to the initialized capacitance variation curve, the touch positions of the touch interface, and the difference mutual capacitance values obtained by determining a difference between the touch and indirect (untouch) capacitance data. The information related to the touch data and the indirect data comprises of a class and a subclass of information in which the class relates to a set of elliptically shaped touching objects having a particular major axis length and a minor axis length, and the subclass relates to a set of elliptically shaped touching objects belonging to a given class having a particular angle of orientation.

At block 506, the difference mutual capacitance values obtained at block 504 are mapped onto the capacitance variation curve over a specified grid location based on a touch position of the predefined touching object on the touch surface. At block 508, a peak value of the capacitance variation curve is identified and stored in, for example, a memory 910 of an apparatus 900 (see FIG. 9). At block 510, the capacitance variation curve is normalized based on the identified peak value. At block 512, the input touch data is evaluated and approximated by a 2D Gaussian curve. For example, the input touch data for the predefined touching object is compared to a plurality of standard deviations along major and minor axes to determine a 2D Gaussian curve that best approximates the capacitance variation curve of the input data for the given angle of orientation (subclass).

At block 514, the standard deviations of the major and minor axes along both the directions in a 2D system corresponding to the best 2D Gaussian curve is stored in, for example, the memory 910 of the apparatus 900. In one exemplary embodiment, the operations of block 514 may correspond to the operations of block 406 in FIG. 4.

According to an exemplary embodiment, each subclass contains three attributes, namely, the major axis length, the minor axis length, and an angle of orientation. Input touch data for a touching object can be approximated by a 2D anisotropic Gaussian curve by determining a sum of squared errors between Gaussian curves having different peak (A), $\sigma_{major}$ and $\sigma_{minor}$ values and the corresponding attributes (i.e., peak (A), $\sigma_{major}$ and $\sigma_{minor}$ values) of input touch data. The Gaussian curve that provides the least error is considered to be the best approximation of the input touch data. Equation (1) below is an equation of an exemplary 2D-Gaussian curve.

$$f(x, y) = A e^{-(a(x-\mu_x)^2 + b(x-\mu_x)(y-\mu_y) + c(y-\mu_y)^2)} \quad (1)$$

in which ($\mu x$, $\mu y$) comprises the center of the touching object, x and y are respectively positions of electrodes along the X and Y axes, and A is the peak value. Function $f(x, y)$ in Equation (1) denotes the 2D Gaussian curve having the least error and provides the attributes, such as peak amplitude (A), $\sigma_{major}$ and $\sigma_{minor}$. Values of a, b, and c are given below in which $\theta$ comprises the angle of orientation of the touching object with respect to X-axis.

$$a = \frac{\cos^2\theta}{2\sigma_{major}^2} + \frac{\sin^2\theta}{2\sigma_{minor}^2} \quad (2)$$

$$b = -\frac{\sin 2\theta}{4\sigma_{major}^2} + \frac{\sin 2\theta}{4\sigma_{minor}^2} \quad (3)$$

$$c = \frac{\sin^2\theta}{2\sigma_{major}^2} + \frac{\cos^2\theta}{2\sigma_{minor}^2} \quad (4)$$

Figure 6:
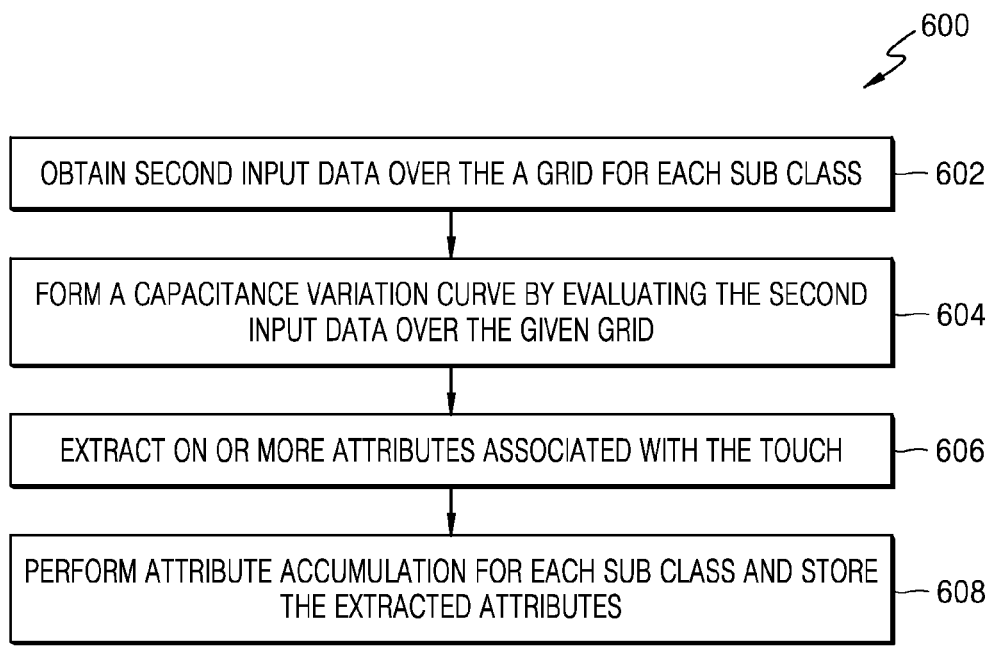
FIG. 6 is a flow chart depicting a method performed during a training phase according to an exemplary embodiment of the subject matter disclosed herein.

FIG. 6 is a flow chart depicting a method 600 performed during a training phase according to an exemplary embodiment. In one exemplary embodiment, the operations of block 406 in FIG. 4 may correspond to the operations of method 600. At block 602, a second input data comprising panel grid metadata and subclass metadata is obtained over a grid corresponding to the touch panel for each subclass of a class. At block 604, a capacitance variation curve is formed by mapping the second input data over the given grid. In particular, the capacitance variation curve is formed by mapping a plurality of touch responses for a same touching object by varying the touch location over a densely spaced 2D grid in which the densely spaced grid comprises equally spaced multiple touch points between electrodes of the touch panel. The capacitance variation curve for a single subclass is obtained using the same touch grid and at different angles of orientation for the touching object. Additionally or alternatively, the capacitance variation curve for a single subclass can be obtained using a plurality of touch grids across the touch surface at the same known angle of orientation of the touching object. At block 606, one or more attributes associated with the touch input are extracted (see, for example, method 500 in FIG. 5). At block 608, attribute accumulation for each subclass is performed and the extracted attributes are stored. The extracted touch attributes comprise of an amplitude, a major axis length and a minor axis length.

According to an exemplary embodiment, each capacitance variation curve formed by the operations of method 600 represents a subclass. Many such capacitance variation curves of same subclass are extracted either by using same touch grid and different angles of orientation of a given touching object and/or by using different touch grids across the panel and the same angle of orientation of the given predefined touching object. Also, some of the noisy values of the data are reduced by using an appropriate threshold that is a selected fraction of the peak of capacitance variation curve. For example, consider that the threshold is defined to be 5% of the peak of capacitance variation curve. Only values that are greater than the threshold value are used to approximate the Gaussian curve. Each capacitance variation curve corresponding to a subclass provides a unique set of attributes namely, a (peak) amplitude (A), a $\sigma_{major}$ and $\sigma_{minor}$. Once these attributes are obtained for multiple capacitance variation curves corresponding to the same subclass, the set of attributes for a class are learned, i.e., stored. The amplitude (A) of given class may be, for example, obtained by taking an average of all the amplitudes obtained for different subclasses of a given class and all the standard deviation tuples ($\sigma_{major}$, $\sigma_{minor}$) obtained for different subclasses may be accumulated and attributed to the particular class.

According to an exemplary embodiment, each class (a touching object) comprises multiple subclasses having varying angles of orientation from 0° to 180° at equal orientation intervals. Attributes of the class are given by an amplitude of the class, that is, the average of amplitudes of subclasses of a given class, and the $\sigma_{major}$ and $\sigma_{minor}$ of the class, which is the array of $\sigma_{major}$ and $\sigma_{minor}$ of the subclasses of the class.

Figure 7:
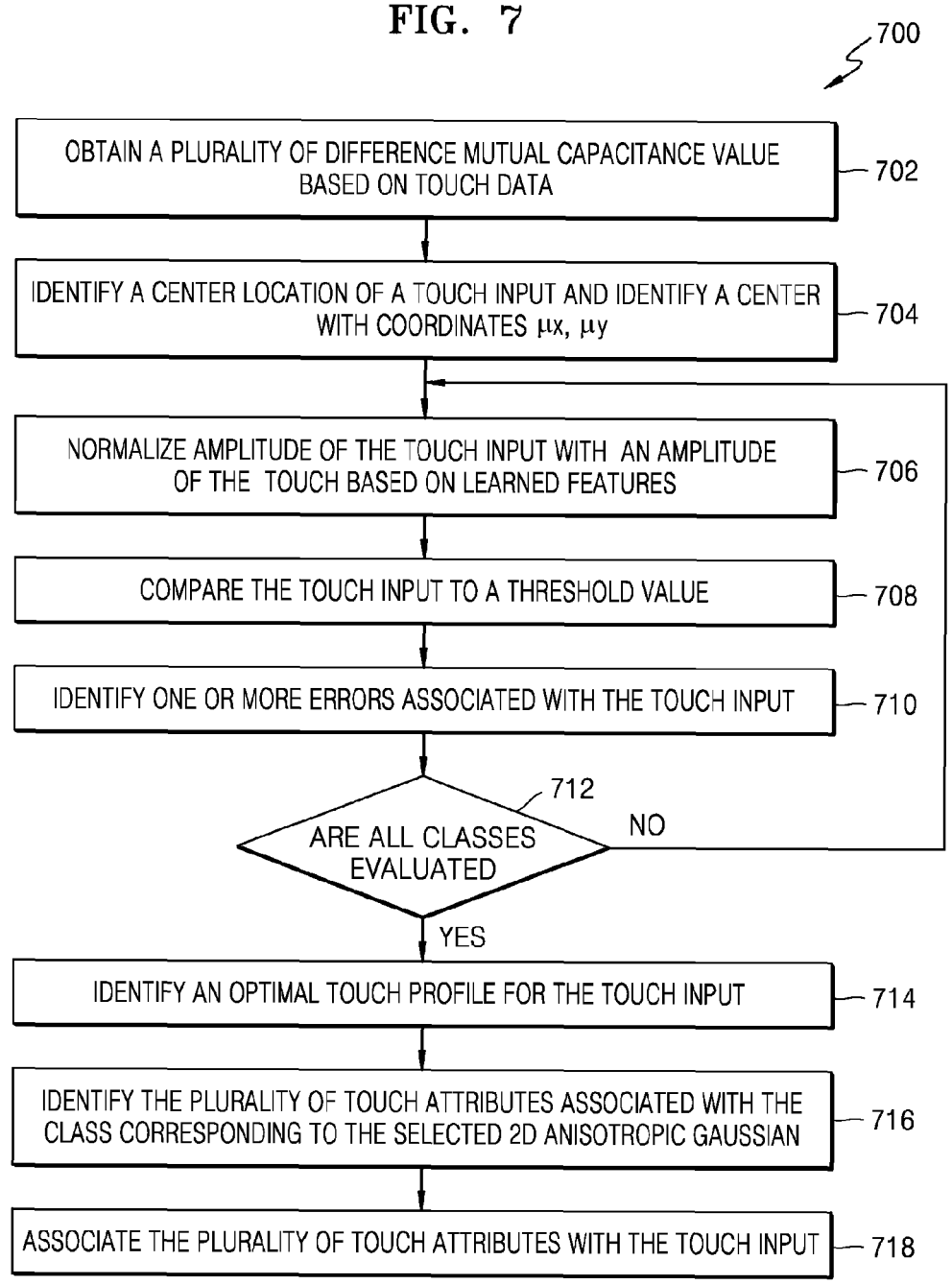
FIG. 7 is a flowchart depicting a method performed during a testing phase according to an exemplary embodiment of the subject matter disclosed herein.

FIG. 7 is a flowchart depicting a method 700 performed during a testing or operational phase according to an exemplary embodiment. In one exemplary embodiment, the operations of blocks 408-414 in FIG. 4 may correspond to the operations of method 700. At block 702, difference mutual capacitance values for a test object are obtained based on touch data and the indirect (untouch) data. At block 704, a center location of the touch input of the test object is identified using a well-known centroid algorithm and a center having coordinates ($\mu x, \mu y$) is identified, in which x and y are the respective positions of electrodes along the X and Y axes. At block 706, the amplitude of the touch input is normalized based on the learned features stored in, for example, the classifier 800 (see FIG. 8), during the training phase (420 in FIG. 4). At block 708, the touch input is compared to a threshold value to remove the noise from the touch input data. At block 710, one or more errors associated with the touch input are identified. For this, all of the standard deviation pairs of the class and all angles of orientation (i.e., subclass) are evaluated. For example, a sum square error value between the touch input data and a 2D anisotropic Gaussian curve represented by the standard deviation tuple ($\sigma_{major}$, $\sigma_{minor}$) for selected angles from 0° to 180° are determined.

At block 712, it is determined whether all the classes have been evaluated. If so, then flow continues to block 714 where an optimal touch profile for the touch input is identified by selecting a 2D anisotropic Gaussian curve corresponding to the touch input for the test object having minimum error. If, at block 712, all of the classes have not been evaluated, then flow returns to block 706.

At block 716, the plurality of touch attributes associated with a class corresponding to the selected 2D anisotropic Gaussian curve is identified. The plurality of touch attributes comprises a major axis length, a minor axis length and an angle of orientation. At block 718, the plurality of touch attributes is associated with the touch input, thereby providing a touch vector for the test object.

Figure 8:
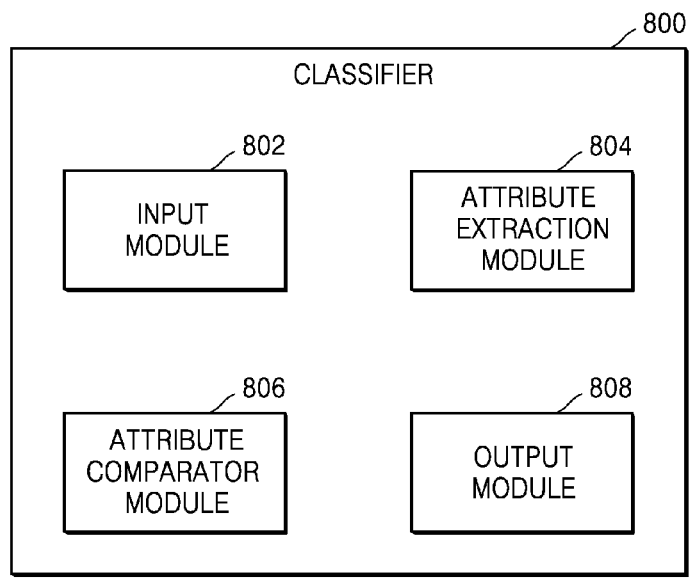
FIG. 8 is a block diagram depicting the functional components of an exemplary classifier in accordance with an exemplary embodiment of the subject matter disclosed herein.

FIG. 8 is a block diagram depicting the functional components of an exemplary classifier in accordance with an exemplary embodiment. In FIG. 8, the classifier 800 comprises an input module 802, an attribute extraction module 804, an attribute comparator module 806 and an output module 808.

In one exemplary embodiment, the input module 802 is configured to receive input data from a plurality of nodes of a touch panel in which the input data comprises a plurality of values corresponding to a difference of mutual capacitance at each node of the plurality of nodes. In one exemplary embodiment, the input module 802 is further configured to receive first input data associated with a touching object in which the first input data comprises information related to a touch data and an indirect data.

In one exemplary embodiment, the attribute extraction module 804 is configured to extract a plurality of attributes corresponding to a plurality of predefined touching objects during a training phase. Further, in one exemplary embodiment, the attribute extraction module 804 is configured to determine a center location of the touching object during the testing phase and to determine an optimal 2D anisotropic Gaussian curve based on a combination of an amplitude, a standard deviation along the major axis and along the minor axis, and an angle of orientation.

Additionally, in one exemplary embodiment, the attribute extraction module 804 is configured in a training phase to compare the input data to a threshold to remove noise from the difference of mutual capacitance data and to approximate the touch data to a 2D anisotropic Gaussian curve to extract a plurality of attributes in which the plurality of attributes comprise a standard deviation in a major axis direction, a minor axis direction and amplitude. Approximating the input touch data with 2D anisotropic Gaussian curve in the training phase comprises learning an amplitude associated with each touching object size and learning a plurality of standard deviations along the major axis and the minor axis of similar 2D anisotropic Gaussians curves. Furthermore, in one exemplary embodiment, the attribute extraction module 804 is configured to map difference capacitance values onto a capacitance variation curve over a specified grid based on touch positions of a touch surface, to identify a peak of the capacitance variation curve, to normalize the capacitance variation curve with the peak, and to approximate the first input data with a 2D anisotropic Gaussian curve during the training phase.

In one exemplary embodiment, the attribute extraction module 804 is configured to receive second input data over a given grid for each subclass to form a capacitance variation curve by evaluating the second input data over the given grid in which the second input data comprises of panel grid metadata and subclass metadata, to extract one or more attributes associated with the touch, performing attribute accumulation for each subclass, and to store the extracted attributes. In one exemplary embodiment, the attribute extraction module 804 is configured to evaluate a plurality of touch responses for a touching object by varying the touch location over a dense 2D grid in which the dense grid comprises equally spaced multiple touch points located between electrodes of the touch panel.

According to an exemplary embodiment, each capacitance variation curve represents a subclass. Many such capacitance variation curves of same subclass can be extracted either by using the same touch grid along with different angles of orientation of a given predefined touching object and/or by using different touch grids across the panel having the same angle of orientation of a given predefined touching object. Also, some of the noisy values of the data are removed by using an appropriate threshold as a fraction of the peak of capacitance variation curve. Each capacitance variation curve corresponding to a subclass provides a unique set of attributes, namely, (peak) amplitude (A), $\sigma_{major}$ and $\sigma_{minor}$. The attribute extraction module 804 is further configured to evaluate a plurality of touch responses for a same touching object by varying touch location over a dense 2D grid in which the dense grid comprises equally spaced multiple touch points between electrodes of the touch panel.

According to an exemplary embodiment, the attribute extraction module 804 is also configured to identify a center location of a touch input, to normalize the touch input based on an amplitude of the touch, to compare the touch input to a threshold to remove noise from the input data, to identify one or more errors associated with the touch input, and to identify an optimal touch profile for the touch input by selecting a 2D anisotropic Gaussian curve corresponding to a minimum error to provide a touch vector for the touch input.

In one exemplary embodiment, the attribute comparator module 806 is configured to obtain a plurality of touch attributes associated with a touching object in a testing phase by comparing the input data to a plurality of attributes extracted during the training phase. For example, when input data associated with a touching object is obtained from a plurality of nodes of a touch panel, a plurality of attributes associated with the touching object is extracted by the attribute extraction module 804. Once the attributes associated with the touching object are obtained, the attributes extracted are compared with the learned and stored attributes that have been extracted during training phase. The result of the comparison is input to the output module 808.

In one exemplary embodiment, the output module 808 is configured to associate the plurality of touch attributes of a touching object in the testing phase with the length of the major axis and the length of the minor axis corresponding to an optimal 2D anisotropic Gaussian curve. Further, the output module 808 is configured to associate the plurality of touch attributes of the touching object in the testing phase with the length of the major axis and the length of the minor axis corresponding to the optimal 2D anisotropic Gaussian curve, to identify the plurality of touch attributes associated with a class corresponding to the selected 2D anisotropic Gaussian curve and to associate the plurality of touch attributes with the touch input. In one exemplary embodiment, the output module 808 selects the best fit of touch profile by choosing the Gaussian curve corresponding to the minimum error. The plurality of touch attributes correspond to a minor axis length, a major axis length, and an angle of orientation. The touch attributes (major axis length, minor axis length and the angle of orientation) associated with the class corresponding to the best fit 2D anisotropic Gaussian are associated with the input touch profile. Similarly, an angle of orientation of input touch profile is the same as the angle of orientation of the best fit 2D anisotropic Gaussian curve.

Figure 9:
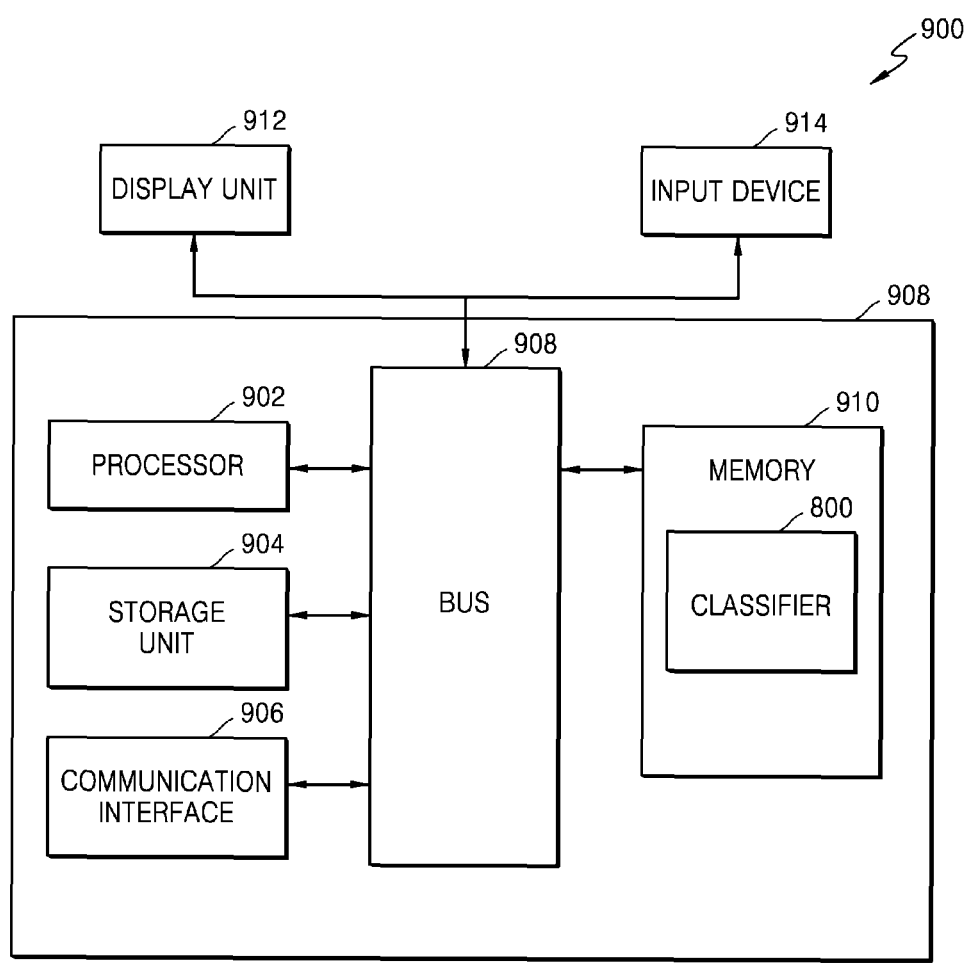
FIG. 9 depicts a block diagram of an exemplary device comprising multiple functional components, such as those shown in FIG. 8, for implementing various exemplary embodiments of the subject matter disclosed herein.

FIG. 9 depicts a block diagram of an exemplary electronic device 900 comprising multiple functional components, such as those shown in FIG. 8, for implementing various exemplary embodiments. In one exemplary embodiment, device 900 comprises a handheld device, such as, but not limited to, a smart phone. In another exemplary embodiment, device 900 comprises a computing device, such as, but not limited to, a tablet, a personal computer (PC), or a laptop. In FIG. 9, device 900 comprises a processor 902, a memory 910, a storage unit 904, a communication interface 906, a bus 908, a display unit 912 and an input device 914.

The processor 902 can be any type of computational circuit, such as, but not limited to, a microprocessor, a microcontroller, a complex instruction set computing microprocessor, a reduced instruction set computing microprocessor, a very long instruction word (VLIW) microprocessor, an explicitly parallel instruction computing microprocessor, a graphics processor, a digital signal processor, or any other type of processing circuit. The processor 902 may also comprise embedded controllers, such as generic or programmable logic devices or arrays, application specific integrated circuits (ASICs), single-chip computers, smart cards, and the like.

The memory 910 may be a volatile memory and/or a non-volatile memory. In one exemplary embodiment, the memory 910 may comprise the classifier module 800 for determining shape and orientation of a touching object on a touch surface or touch panel according to one or more exemplary embodiments illustrated in FIG. 1 through FIG. 8.

The storage unit 904 may be configured to store a plurality of touch information associated with a plurality of touching objects. The memory 910 and the storage unit 904 may comprise any suitable memory device(s) for storing data and machine-readable instructions, such as a read only memory (ROM), a random access memory (RAM), an erasable programmable read only memory (EPROM), an electrically erasable programmable read only memory (EEPROM), a hard drive, and/or a removable media drive for handling compact disks, digital video disks, diskettes, magnetic tape cartridges, memory cards, and/or Memory Sticks™, and the like.

Exemplary embodiments of the subject matter disclosed herein may be implemented in conjunction with modules including functions, procedures, data structures, and application programs for performing tasks defining abstract data types and/or low-level hardware contexts. The classifier 800 may be stored in the form of machine-readable instructions on any of the above-mentioned storage media and may be executable by the processor 902. For example, a computer program may include machine-readable instructions capable of determining shape and orientation of an object on a touch surface according to an exemplary embodiment as described herein. In one exemplary embodiment, the program may be included on a compact disk-read only memory (CD-ROM) and loaded from the CD-ROM to a hard drive in the non-volatile memory. In an alternative exemplary embodiment, the classifier 800 may be comprises as a state machine.

The communication interface 906 is configured to handle the communications between various components of the device 900. The display unit 912 is configured for displaying an output associated with the output module 808 of the classifier 800. In one exemplary embodiment, display unit 912 is a touch-screen display. The bus 908 acts as interconnect between various components of the device 900. The input device 914 is well known to the person skilled in the art and hence the explanation is thereof omitted.

The exemplary embodiments have been described herein with reference to specific embodiments, and it will be evident that various modifications and changes may be made to these embodiments without departing from the broader spirit and scope of the various exemplary embodiments. Furthermore, the various devices, modules, and the like, described herein may be enabled and operated using hardware circuitry, for example, complementary metal oxide semiconductor (CMOS) based logic circuitry, firmware, software and/or any combination of hardware, firmware, and/or software embodied in a machine-readable medium. For example, the various electrical structure and methods may be embodied using transistors, logic gates, and electrical circuits, such as application specific integrated circuits (ASICs).

I claim:

1. A method for determining shape and orientation of a touch on a touch interface, the method comprising:
    receiving input data from a touch surface corresponding to the touch from the touch interface, the touch surface comprising an axis and a plurality of nodes, the input data for the touch comprising a plurality of values corresponding to a difference of mutual capacitance at each node, and the touch comprising a shape and an orientation with respect to the axis of the touch surface;
    determining a normalized peak amplitude of the input data for the touch;
    comparing the normalized peak amplitude of the input data for the touch with different angles of orientation of each of a plurality of two-dimensional (2D) Gaussian curves, each 2D Gaussian curve respectively corresponding to input data for a training-set input touch of a plurality of training-set input touches;
    determining a minimum error between the input data for the touch and each of differently oriented plurality of 2D Gaussian curves; and
    associating attributes of the training-set input touch corresponding to the minimum error with an input touch, the attributes of the training-set input touch corresponding to the minimum error comprising an input-touch difference amplitude, a length of a major axis of the input touch and a length of a minor axis of the input touch.

2. The method of claim 1, wherein comparing the normalized amplitude of the input data for the touch with different angles of orientation of each of a plurality of two-dimensional (2D) Gaussian curves comprises:
    mapping a plurality of touch data for each of a plurality of training-set input touches onto a densely spaced 2D grid for a plurality of orientations with respect to the axis of the touch surface, the spaced 2D grid comprising a plurality of equally spaced touch points between electrodes of the touch surface; and
    comparing the normalized amplitude of the input data for the touch with an amplitude each training-set input touch.

3. The method of claim 2, wherein mapping a plurality of touch data for each of a plurality of training-set input touches onto a densely spaced 2D grid for a plurality of orientations further comprises:
    extracting the attributes for each training-set input touch.

4. The method of claim 1, further comprising:
    obtaining training-set input touch data for each of a plurality of training-set input touches and orientations, the training-set input touch data comprising touch data and indirect touch data;

mapping difference mutual capacitance values for each of the plurality of training-set input touches onto a capacitance variation curve over a grid location corresponding to each training-set input touch;

identifying a peak value of the difference mutual capacitance values for each training-set input touch of the plurality of training-set input touches;

normalizing the capacitance variation curve for each training-set input touch of the plurality of training-set input touches based on the peak value for respective training-set input touch;

approximating the training-set input data for each training-set input touch of the plurality of training-set input touches by a two-dimensional Gaussian curve; and determining a standard deviation of a major axis and a standard deviation of a minor axis for each training-set input touch of the plurality of training-set input touches.

5. The method of claim 4, further comprising:
initializing the capacitance variance curve for the touch surface based on a size of the touch surface.

6. The method of claim 5, further comprising:
storing the standard deviation of a major axis and the standard deviation of a minor axis for each training-set input touch of the plurality of training-set input touch.

7. The method of claim 5, wherein the touch surface is part of a touch-screen display.

8. The method of claim 7, wherein the touch-screen display is part of a smart phone or a tablet.

9. A system, comprising:
a touch-screen display comprising a touch surface having an axis and a plurality of nodes; and
at least one processor coupled to the touch-screen display, the at least one processor being configured to:
receive input data from the touch surface corresponding to a touch, the input data for the touch comprising a plurality of values corresponding to a difference of mutual capacitance at each node of the touch surface, and the touch comprising a shape and an orientation with respect to the axis of the touch surface;
determine a normalized peak amplitude of the input data for the touch;
compare the normalized peak amplitude of the input data for the touch with different angles of orientation of each of a plurality of two-dimensional (2D) Gaussian curves, each 2D Gaussian curve respectively corresponding to input data for a training-set input touch of a plurality of training-set input touches;
determine a minimum error between the input data for the touch and each of differently oriented plurality of 2D Gaussian curves;
associate attributes of the training-set input touch corresponding to the minimum error with an input touch, the attributes of the training-set input touch corresponding to the determined minimum error comprising an input-touch difference amplitude, a length of a major axis of the input touch and a length of a minor axis of the input touch; and
determine a touch vector for the input touch.

10. The system of claim 9, wherein the at least one processor is further configured to:
map a plurality of touch data for each of a plurality of training-set input touches onto a densely spaced 2D grid for a plurality of orientations with respect to the axis of the touch surface, the densely spaced 2D grid comprising a plurality of equally spaced touch points between electrodes of the touch surface; and
compare the normalized amplitude of the input data with an amplitude each training-set input touch.

11. The system of claim 10, wherein the at least one processor is further configured to:
extract the attributes for each training-set input touch.

12. The system of claim 9, wherein the at least one processor is further configured to:
obtain training-set input touch data for each of a plurality of training-set input touches and orientations, the training set input touch data comprising touch data and indirect touch data;
map difference mutual capacitance values for each of the plurality of training-set input touches onto a capacitance variation curve over a grid location corresponding to each training-set input touch;
identify a peak value of the difference mutual capacitance values for each training-set input touch of the plurality of training-set input touches;
normalize the capacitance variation curve for each training-set input touch of the plurality of training-set input touches based on the peak value for respective training-set input touch;
approximate the training-set input data for each training-set input touch of the plurality of training-set input touches by a two-dimensional Gaussian curve; and
determine a standard deviation of a major axis and a standard deviation of a minor axis for each training-set input touch of the plurality of training-set input touches.

13. The system of claim 12, wherein the at least one processor is further configured to:
initialize the capacitance variance curve for the touch surface based on a size of the touch surface.

14. The system of claim 12, wherein the at least one processor is further configured to:
store the standard deviation of a major axis and the standard deviation of a minor axis for each training-set input touch of the plurality of training-set input touch.

15. The system of claim 9, wherein the touch-screen display is part of a smart phone or a tablet.

16. A method for determining shape and orientation of a touch on a touch interface, the method comprising:
obtaining training-set input touch data for each of a plurality of training-set input touches and orientations, a touch surface comprising an axis and a plurality of nodes, and the training set input touch data comprising touch data and indirect touch data received from the touch interface;
mapping difference mutual capacitance values for each of the plurality of training-set input touches onto a capacitance variation curve over a grid location corresponding to each training-set input touch;
identifying a peak value of the difference mutual capacitance values for each training-set input touch of the plurality of training-set input touches;
normalizing the capacitance variation curve for each training-set input touch of the plurality of training-set input touches based on the peak value for respective training-set input touch;
approximating the training-set input data for each training-set input touch of the plurality of training-set input touches by a two-dimensional Gaussian curve;

determining a standard deviation of a major axis and a standard deviation of a minor axis for each training-set input touch of the plurality of training-set input touches;

storing the standard deviation of a major axis and the standard deviation of a minor axis for each training-set input touch of the plurality of training-set input touch.

17. The method of claim 16, further comprising:

receiving input data from the touch surface corresponding to a first touch from the touch surface, the first touch comprising a shape and an orientation with respect to the axis of the touch surface;

determining a normalized peak amplitude of the input data for the first touch;

comparing the normalized peak amplitude of the input data for the first touch with different angles of orientation of each of a plurality of two-dimensional (2D) Gaussian curves, each 2D Gaussian curve respectively corresponding to input data for a training-set input touch of the plurality of training-set input touches;

determining a minimum error between the input data of the first touch and each of differently oriented plurality of 2D Gaussian curves;

associating attributes of the training-set input touch corresponding to the minimum error with the input touch, the attributes of the training-set input touch corresponding to the minimum error comprising an input-touch difference amplitude, a length of a major axis of the first touch and a length of a minor axis of the first touch; and determining a touch vector for the first touch.

18. The method of claim 17, wherein comparing the normalized amplitude of the input data of the first touch with different angles of orientation of each of a plurality of two-dimensional (2D) Gaussian curves comprises:

mapping a plurality of touch data for each of the plurality of training-set input touches onto a densely spaced 2D grid for a plurality of orientations with respect to the axis of the touch surface, the densely spaced 2D grid comprising a plurality of equally spaced touch points between electrodes of the touch surface; and comparing the normalized amplitude of the input data for the first touch with an amplitude each training-set input touch.

19. The method of claim 16, wherein the touch surface is part of a touch-screen display.

20. The method of claim 19, wherein the touch-screen display is part of a smart phone or a tablet.

\* \* \* \* \*